June 27, 1933.     G. S. LANE     1,915,793
CLUTCH OR BRAKE MECHANISM
Filed Feb. 8, 1930
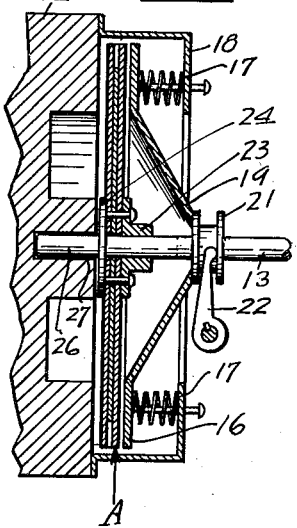
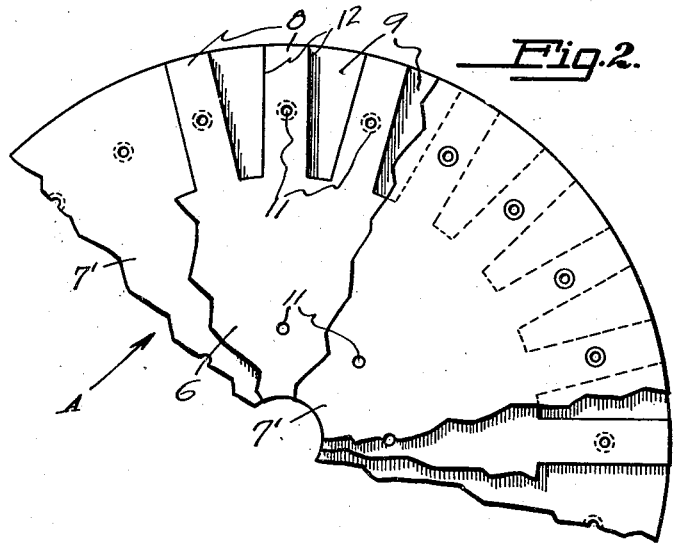
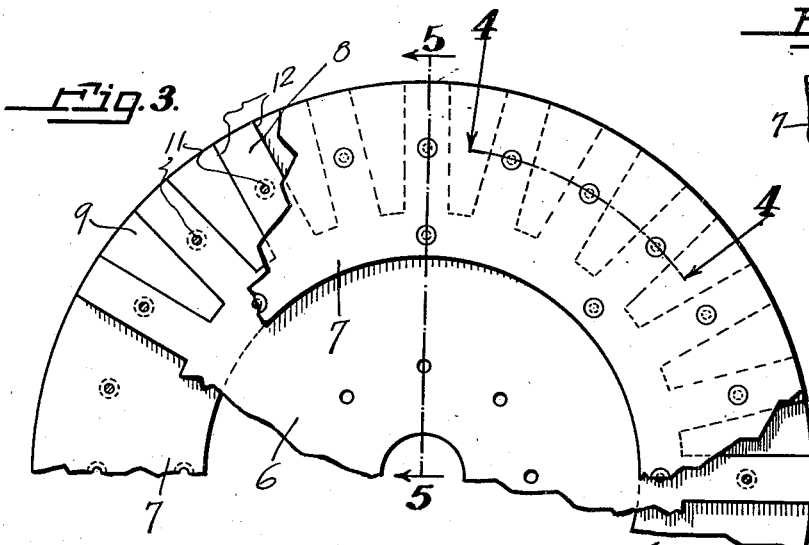
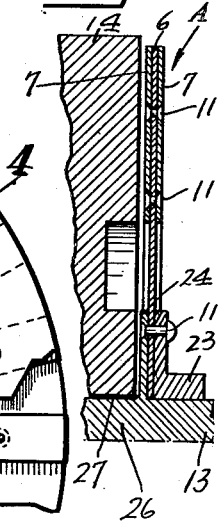
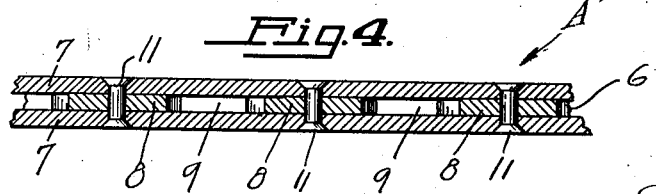
INVENTOR
GEORGE S. LANE
BY
ATTORNEY Patented June 27, 1933

1,915,793

UNITED STATES PATENT OFFICE

GEORGE S. LANE, OF SAN ANSELMO, CALIFORNIA, ASSIGNOR TO WALLACE SHEEHAN, OF SAN FRANCISCO, CALIFORNIA, AS TRUSTEE

CLUTCH OR BRAKE MECHANISM

Application filed February 8, 1930. Serial No. 426,869.

This invention relates to disc clutches and brakes.

It is the primary object of the invention to provide a frictional engagement mechanism particularly adapted for use as a clutch, in which the unequal contact and wear of its friction disc is corrected to decrease the pressure toward and adjacent the outer circumference thereof, inversely to the increase of the travel of the points of the disc adjacent and at its outer periphery, whereby the resulting frictional contact is equalized throughout the entire friction area of the disc.

This application relates to the subject matter disclosed in my application for clutch and brake mechanisms, Serial No. 410,973, filed December 2, 1929.

It is particularly an object of this invention to provide a mat fixedly secured between two friction faces, which mat has outwardly extending radial fingers thereon so that the portions of the friction faces opposite the fingers are fixedly spaced from each other and are fully supported thereat by said fingers, to offer resistance to the pressure exerted on the facings, while the portions of the friction faces overlying the cuts between the adjacent fingers are unsupported and offer less resistance to the pressure exerted on the faces, which supported and unsupported portions are so arranged that the surface travel of points of the facings multiplied by the pressure thereon are equal throughout the entire friction surface of the facings.

Another object of this invention is the provision of a disc clutch structure which is so connected to a driving member, that vibration of the disc of the clutch is not transmitted to the driven shaft.

Other objects and advantages are to provide disc clutches and brakes that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing, wherein

Fig. 1 is a sectional view of the clutch.

Fig. 2 is a fragmental face view of the clutch disc, the facing being partly broken away to show the fingers on the mat disc or plate.

Fig. 3 is a fragmental view of a clutch disc, wherein the facings on the mat disc are ring shaped to cover the fingers.

Fig. 4 is an enlarged sectional view of the clutch disc, the section being taken on the line 4—4 of Fig. 3; and Fig. 5 is a sectional view of the clutch disc, the section being taken on the line 5—5 of Fig. 3.

In carrying out my invention, I make use of a plate or mat disc 6, which has full circle, preferably uncorrected friction facings 7 attached to the opposite faces thereof. The disc 6 has outwardly extending, radial fingers 8 thereon, which extend to the outer periphery thereof. The fingers 8 are preferably of the same width throughout, and preferably of the same thickness as the plate 6. The adjacent fingers 8 are circumferentially separated from each other by cuts 9, which latter are of equal length and of a widened V shape, as shown. The plate 6 and the facings 7 are fixedly secured to each other by rivets 11, thru the fingers 8 and thru the hub portion of the plate 6.

The friction facings may be of the full, smooth ring form as the facings 7 in Fig. 3, or they may be in the form of a full disc, as facings 7' in Fig. 2.

In operation pressure is exerted on both facings 7. This pressure is undiminished on the portions of the facings 7 which are backed, or fixedly supported by the fingers 8. The portions of the facings 7 overlying the cuts 9, are unsupported at the inner faces thereof, consequently the pressure thereat is diminished. The widened V shape of the cuts 9 leaves a substantially true V shaped portion of the facings 7 above each cut entirely free from backing, because at and near the edges of the cut the facings are partially backed or supported against the clutch pressure. The said V shape tapers toward the inner periphery of the plate 6.

The radial edges 12 of each finger 8 are substantially parallel with each other. Both faces of each finger 8 are also parallel with each other. The heads of the rivets 11 are countersunk into the respective facings 7 to provide a smooth, uninterrupted friction surface on the outer faces of the facings 7. It is to be noted that the number of fingers 8 on the plate 6 is to be determined by the conditions in the clutch. In some clutches twelve fingers on the plate 6 are sufficient and advisable.

In operation the clutch disc, denoted in its entirety by the letter A, is mounted on a driven shaft 13, and it is disposed between a driving member, such as a fly-wheel 14, and a pressure plate 16. The clutch disc A may be either slidable on the shaft 13 or it may be fixedly mounted thereon. In the first instance the pressure plate would slide the clutch disc A against the fly-wheel 14. The fixed mounting of the clutch disc A on the shaft 13 is illustrated in Figs. 1 and 5. In this instance the disc A is to be bent so that the portion thereof adjacent its outer circumference is pressed between the fly-wheel 14 and the pressure plate 16, into frictional engagement with both. The entire friction ring facings 7 are thus frictionally engaged by the driving members and power is transmitted to the shaft 13. The pressure plate 16 is pressed against the clutch disc 16 by means of coil springs 17, which latter are disposed within and bear against the clutch cover plate 18. The pressure plate 16 is slidably and rotatably journaled on the shaft 13 in any suitable manner, such as by a central rib 19 and a collar 21, to which latter is connected the usual clutch releasing lever 22, to move the pressure plate 16 away from the clutch disc A, against the action of the coil springs 17, whenever the clutch is to be released.

The clutch disc A is mounted between a collar 23 on the shaft 13, and an annular flange 24 on said shaft. Beyond the flange 24 extends a tail shaft 26 integral with the flange 24, which tail shaft 26 is journaled in a bearing 27 in the center of the fly-wheel 14. In this manner the shaft 13 and the center of the hub of the disc A are supported at both ends. The central rivets 11 extend thru the flange of the collar 23, thru the hub of the clutch disc A, and thru the flange 24. The outer ring portion of the disc A, with the ring facings 7 thereon is bent around the fixed central hub by the action of the ring-like pressure plate 16 thereon. The pressure on the facings 7 is corrected by the afore-described fingers 8 on the plate 6, whereby the operation of the clutch mechanism is rendered highly efficient, and completely noiseless. The afore-described lightening of the outer periphery of the disc A, also results in a reduction of the spinning inertia of the clutch disc.

Having thus described this invention, what I claim and desire to secure by Letters Patent is:

1. In a device of the character described a disc; a friction facing fastened to each face of the disc, said disc having radial cuts therein extending from the outer periphery toward the inner periphery of the disc to provide, for corresponding portions of the opposite facings, lessened resistance to the pressure exerted on said facings by leaving unsupported opposed portions of the inner faces of the facings.

2. In a device of the character described a disc; a friction facing fastened to each face of the disc, said disc having radial cuts therein extending from the outer periphery toward the inner periphery of the disc to provide, for corresponding portions of the opposite facings, lessened resistance to the pressure exerted on said facings by leaving unsupported opposed portions of the inner faces of the facings.

3. In a device of the character described, a mat disc; a smooth friction disc fastened on each face thereof; and corrections on the mat disc arranged to decrease the resistance, of a plurality of opposed portions of the facings, to pressure exerted on the opposite facings, substantially in proportion to the increase of the circumferential rubbing surface of said facings, from the inner toward the outer peripheries thereof, said corrections comprising radial solid segments formed between radial cuts in the mat, said cuts extending from the outer periphery to the inner periphery thereof.

4. In a device of the character described, a disc; a friction facing fastened on each face of said disc; a plurality of radial fingers on said disc extending outwardly to the outer periphery of the disc, to fixedly space opposed portions of the facings and to leave other opposed portions of the facings unsupported intermediate the adjacent fingers.

5. In a device of the character described, a disc; a friction facing fastened on each face of said disc; a plurality of radial fingers on said disc extending outwardly to the outer periphery of the disc, to fixedly space opposed portions of the facings and to leave other opposed portions of the facings unsupported intermediate the adjacent fingers, each finger having substantially parallel radial edges.

6. In a device of the character described, a disc; a friction facing fastened on each face of said disc; a plurality of radial fingers on said disc extending outwardly to the outer periphery of the disc, to fixedly space opposed portions of the facings and to leave other opposed portions of the facings unsupported intermediate the adjacent fingers, the spacing between each pair of adjacent fingers being of a widened V shape.

7. In a device of the character described, a mat disc, a full, smooth friction facing fastened on each face of said disc, said mat disc having radial cuts therein extending and gradually decreasing from the outer periphery of the disc toward its inner periphery to provide for lessened resistance of the facings to pressure exerted on said facings, the resistance being gradually diminishing toward the outer periphery of the facings, and parallel faced fingers formed between the respective cuts, each finger having substantially parallel radial edges providing thereat resistance to pressure exerted upon the opposite friction facings.

8. In a device of the character described, a mat disc; a full, smooth friction facing fastened on each face of said disc, said mat disc having radial cuts therein extending and gradually decreasing from the outer periphery of the disc toward its inner periphery, to provide for lessened resistance of the facings to pressure exerted on said facings, the resistance being gradually diminishing toward the outer periphery of the facings, and parallel faced fingers formed between the respective cuts, each finger having substantially parallel radial edges providing thereat resistance to pressure exerted upon the opposite friction facings, said cuts being so formed as to provide, entirely unsupported, a substantially V shaped area thereat.

9. In a device of the character described, a disc; a friction facing fastened on each face of said disc; a plurality of radial fingers on said disc extending outwardly to the outer periphery of the disc, to fixedly space opposed portions of the facings and to leave other opposed portions of the facings unsupported intermediate the adjacent fingers, the fingers being of such width that the unsupported portions of the facings are more than one-fourth of the total area of the respective facings.

10. In a device of the character described, a disc; a friction facing fastened on each face of said disc; a plurality of radial fingers on said disc extending outwardly to the outer periphery of the disc, to fixedly space opposed portions of the facings and to leave other opposed portions of the facings unsupported intermediate the adjacent fingers, said fingers being so arranged that the unsupported area of the facings is increased at the outer peripheries thereof.

11. In a device of the character described, a hub; a plurality of fingers extending radially outward from the hub; friction facings on the opposite sides of the fingers spaced from each other by said fingers to have fixedly spaced portions, and portions overlying the space between the fingers for the self adjustment of friction in accordance with the pressure exerted on the facings.

12. In a clutch disc for use in the plate type of clutch, a pair of spaced ringlike friction facings; means to fixedly support portions of the facings to permit other portions of the facings to resiliently react toward each other thru pressure being exerted thereon; and means to carry said facings and said supporting means.

13. In a clutch disc for use in the plate type of clutch, a hub; a pair of ringlike friction facings; fingers extended radially from the hub to support the facings in spaced relation; and means adjacent one circumference of the ringlike facings to secure the facings and fingers together.

14. In a clutch disc for use in the plate type of clutch, a hub; a pair of ringlike friction facings; fingers extended radially from the hub to support the facings in spaced relation; and means adjacent one circumference of the ringlike facings to secure the facings and fingers together, whereby the remaining surface of the facings overlying the fingers resists the pressure exerted against said facings to a greater degree than the portions of the facings overlying the space between the fingers.

15. In a disc type clutch, a pair of ringlike facings; a plurality of fingers on which said facings are supported in spaced relation, the portions of the facings overlying the spaces between the fingers being unsupported at all times; and means to support said fingers in operative position in a clutch mechanism.

16. In a clutch, a pair of ringlike facings; a plurality of fingers on which said facings are supported in spaced relation, the portions of the facings overlying the spaces between the fingers being unsupported at all times; means adjacent one circumference of the ringlike facings to secure the facings and fingers together; and means to support said fingers in operative position in a clutch mechanism.

17. In a clutch, a pair of ringlike facings; a plurality of fingers on which said facings are supported in spaced relation, the portions of the facings overlying the spaces between the fingers being unsupported at all times; means adjacent one circumference of the ringlike facings to secure the facings and fingers together, the facings being unsupported between the fingers for self adjustment of friction in accordance with the pressure exerted on the facings; and means to support said fingers in operative position in a clutch mechanism.

18. In a clutch, a pair of concentrically arranged ringlike facings; a plurality of fingers to support the facings in spaced relation; means to mount the inner ends of the fingers on a shaft; and means nearer to one circumference of the facings than the other to secure the facings and fingers together, the portions of the facings overlying the fingers defining areas having higher resistance to pressure on the facings than the remaining areas of the facings.

19. In a clutch, a pair of concentrically arranged ringlike facings; a plurality of fingers to support the facings in spaced relation; means to mount the inner ends of the fingers on a shaft; and means nearer to one circumference of the facings than the other to secure the facings and fingers together, whereby the remaining surface of the facings overlying the fingers resists the pressure exerted against said facings to a greater degree than the portions of the facings overlying the space between the fingers, the facings being unsupported between the fingers for self adjustment of friction in accordance with the pressure exerted on the facings.

20. A clutch disc comprising a hub; a plurality of fingers extending radially outward from the hub in spaced circumferential relation therearound; and a pair of ring-like friction facings secured on opposite faces of the fingers, the portions of the facings overlying the fingers define areas having higher resistance to pressure on the facings than the remaining areas of the facings.

In testimony whereof, I have hereunto set my hand at San Francisco, California, this 14th day of January, 1930.

GEORGE S. LANE.